United States Patent [19]
Olschewski et al.

[11] 4,284,310
[45] Aug. 18, 1981

[54] ROTARY DRILL BIT

[75] Inventors: Armin Olschewski, Schweinfurt; Manfred Brandenstein, Eussenheim; Lothar Walter; Heinrich Kunkel, both of Schweinfurt; Horst M. Ernst, Eltingshausen, all of Fed. Rep. of Germany

[73] Assignees: Sandvik AB, Sandviken; Aktiebolaget SKF, Gothenburg, both of Sweden

[21] Appl. No.: 63,542

[22] Filed: Aug. 3, 1979

[30] Foreign Application Priority Data

Sep. 5, 1978 [DE] Fed. Rep. of Germany ... 7826323[U]

[51] Int. Cl.³ .............................................. F16C 19/18
[52] U.S. Cl. ..................................... 308/8.2; 175/372
[58] Field of Search ................ 308/8.2, 174, 230, 233, 308/189 R, 187.1; 175/371, 372

[56] References Cited

U.S. PATENT DOCUMENTS

| 1,905,079 | 4/1933 | Wellensiek et al. | 308/8.2 |
| 1,989,261 | 1/1935 | Behnke | 308/8.2 |
| 2,690,935 | 10/1954 | Alexander | 308/8.2 |
| 3,971,604 | 7/1976 | Kapaan | 308/174 |
| 4,035,039 | 7/1977 | Johansson et al. | 308/8.2 |
| 4,183,417 | 1/1980 | Levefelt | 308/8.2 |

Primary Examiner—Lenard A. Footland
Attorney, Agent, or Firm—Eugene E. Renz, Jr.

[57] ABSTRACT

A rotary drill bit assembly comprising a drill bit body, at least one trunnion formed integrally with the drill bit body and a rotary cutter rotatably supported on the trunnion by bearing means. The bearing means consist of at least two rows of balls which ride between an inner raceway groove formed integrally in the trunnion and an outer raceway groove formed in the interior peripheral surface of the rotary cutter. A filling hole or port is provided in the drill bit body which terminates at its inner end in each raceway so that the balls of the corresponding row may be assembled in the annular space between the trunnion and rotary cutter. A filler pin closes the corresponding filling hole or port and has a terminal end which complements the cross section of the raceway groove.

9 Claims, 2 Drawing Figures

ROTARY DRILL BIT

BACKGROUND OF THE INVENTION

The present invention relates to rotary drill bits including a plurality of conically shaped rotary cutters and specifically to one wherein the cutters are rotatably supported in at least two series of balls on a trunnion of the drill bit body.

Rotary drill bits are previously known wherein each trunnion is provided with an annular shoulder adjacent the drill bit body and the trunnion is fastened by means of trunnion bolts in the bore of the annular shoulder. The row of balls near the drill bit body runs in a roller path groove formed in part by the annular shoulder and in part by a bearing inner ring mounted on the trunnion bolt. A second series of balls is arranged further away from the drill bit body and runs in a roller path groove formed in part by the bearing inner ring and in part by an enlarged portion at the end of the trunnion bolt. By reason of this construction, the trunnion has a relatively low strength characteristic because of the resultant weakening due in part to the incorporated trunnion bolt with the result that in normal applications the roller drill bit is not able to effectively withstand high impact stresses and in many cases breaks even at normal operating conditions. Breakage of course causes considerable damage. Furthermore, in this type of assembly the rotary cutters are not adequately secured against being displaced from the trunnion by reason of the fact that the trunnion bolt under normal operating conditions tends to work loose and give way as the result of high trunnion stresses. Lastly, it is noted that manufacture and assembly of the rotary drill bit described above is rather expensive and may be termed uneconomical because of the precise and accurate machining required of some of the mating parts.

SUMMARY OF THE INVENTION

The present invention is characterized by novel features of construction and arrangement to provide advantages over the prior art assemblies discussed above.

To this end the rotary drill bit of the present invention comprises a plurality of conical rotary cutters, each rotatably journalled on a trunnion projecting from the drill bit body. The bearing means supporting each rotary cutter comprises at least two rows of balls. The balls of each row ride in a groove defining an inner raceway formed integrally in the trunnion and a groove defining an outer raceway formed in the interior surface of the rotary cutter. A filling port is provided for each of the rows of balls for inserting the balls in the raceways. Each port terminates at its inner end adjacent the respective inner raceway.

The rotary drill bit of the present invention is characterized by a trunnion construction having high rigidity and strength. The mounting arrangement for the rotary cutters is such that they are firmly secured against axial displacement on the trunnion. Furthermore, the assembly is economical to produce. The reason the trunnion of the present invention has greater rigidity and strength than the prior known assemblies discussed above is due to elimination of the incorporated trunnion bolts with bearing races. Another feature of the present invention is the provision of relatively small filling ports which only tend to reduce the effective cross section of the trunnion a small amount. These filling ports are simply and economically incorporated in the trunnion, for example, by conventional boring operation. The filler pins for closing the filling ports are appropriately shaped at their terminal ends to complement the roller raceway grooves so that harmful discontinuities such as edges or steps are not formed at the mouths of the filling ports in the raceway groove.

By forming the raceways integrally with the trunnion and the rotary cutter, special bearing rings for the balls are eliminated. This also adds to the economy of production and simplicity of assembly by maintaining the parts as few as possible.

The filling ports are located in the zone of the trunnion which is subjected to the least amount of stress and this also adds to the strength and rigidity of the overall construction. Another object of the present invention is to provide a roller bit assembly wherein the filler pins which close the filling ports are located in the unstressed zone of the rows of balls so that the ends are not stressed during operation of the assembly. Furthermore, by this construction the need to harden the ends of the filler pins is eliminated and therefore the filler pins can be fabricated from inexpensive weldable carbon steel.

A still further object of the present invention is to provide a rotary drill bit assembly wherein the filling ports are located in a common longitudinal plane of the trunnion which is in the area of least stress in bending.

BRIEF DESCRIPTION OF THE DRAWINGS

These and other objects of the present invention and the various features and details of the operation and construction thereof are hereinafter more fully set forth with reference to the accompanying drawings, wherein.

DESCRIPTION OF THE PREFERRED EMBODIMENTS

Figure 1:
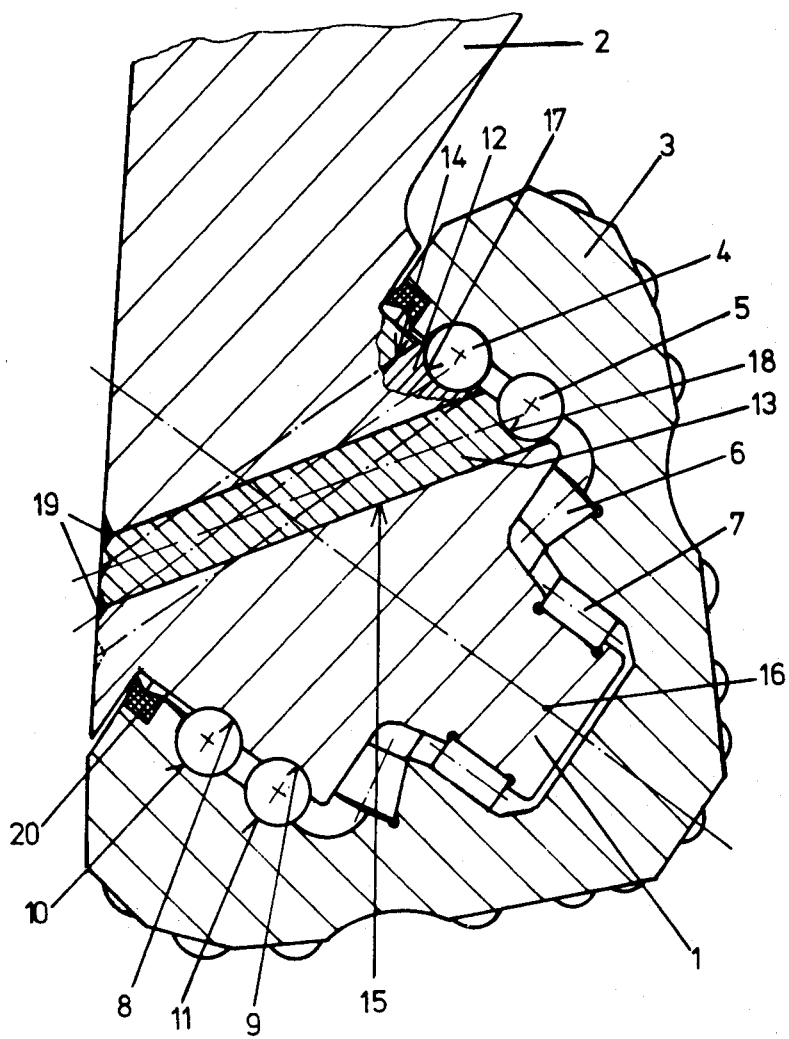
FIG. 1 is a longitudinal cross sectional view through one of the rotary cutters of a rotary drill bit in accordance with the present invention.

Referring now to the drawings and particularly to FIG. 1 thereof, only one of a plurality of trunnions of a rotary drill bit is illustrated. The trunnion 1 is formed integrally with the drill bit body 2. A conical rotary cutter 3 is rotatably supported on the trunnion 1 by bearings at its end facing the drill bit body 2. The bearings comprise a row of balls near the drill bit body 2 and a second row of balls arranged at a distance axially from the first row of balls 4. The bearing support further includes an axial roller bearing 6 located on the inside of the rotary cutter 3 and in the present instance comprised of conical rollers for absorbing the operating pressure directed towards the drill bit body 2 and a radially oriented cylindrical roller bearing 7 which runs on the trunnion 1 of the drill bit body 2.

The ball bearings 4 and 5 run between an inner groove or raceway 8 formed directly in the surface of the trunnion 1 and an outer groove or raceway formed integrally in the interior of the rotary cutter. By reason of this arrangement, the rotary cutter is held in place securely against being withdrawn from the trunnion 1 by the rows of balls 4 and 5.

The balls 4 and 5 for the bearings are inserted through a filling port or hole 14 in the trunnion of the drill bit body 2. The filling ports or holes run essentially transversely to the axis of rotation 16 of the rotary cutter 3 and terminate in the appropriate raceway groove 8, 9 of the trunnion 1. A filler pin 12, 13 is used to plug the terminal end of the filling hole remote from the raceway after the balls have been inserted. The filling port or hole 14 is disposed in a longitudinal cross sectional plane different from the plane of the filling hole 15 so that they do not mutually intersect. The terminal ends 17, 18 of the filler pins 12, 13 are of a predetermined configuration complementing the raceway grooves 8 and 9 so that discontinuities, such as edges or steps which might interfere with the normal rolling motion of the balls in the race grooves are not present. Additionally, the terminal ends of the pins terminating in the raceway grooves are located in the unstressed zone of the ball bearings 4 and 5 adjacent the rotary drill bit. By reason of this, the ends 17, 18 of the filler pins 12, 13 are not exposed to stress and, therefore, do not need to be hardened. The filler pins 12, 13 can be made from an inexpensive carbon steel and secured in a fixed position in the filler ports 14 and 15 simply by welding.

Assembly of a rotary drill bit in accordance with the present invention is rather simple. The axial conical roller bearing 6 is assembled to each rotary cutter and the trunnion is provided with the cylindrical roller bearing 7. Then, the rotary cutter 3 is axially slipped on to its trunnion 1. Following this, the balls of the ball bearings 4 and 5 are successively inserted through the filling ports 14 and 15 respectively until they fill the annular space between the raceway grooves 8 and 10 and 9 and 11. The balls are uniformly distributed about the periphery of the trunnion by rotation of the rotary cutter 3. Finally, the appropriate filler pin 12, 13 is inserted into its respective filling hole and is securely held in place against twisting by the welds 19. A sliding seal 20 seals the space of the rotary cutter toward the outside to prevent escape of lubricant from the bearing space and ingress of harmful dirt products into the bearing space.

Figure 2:
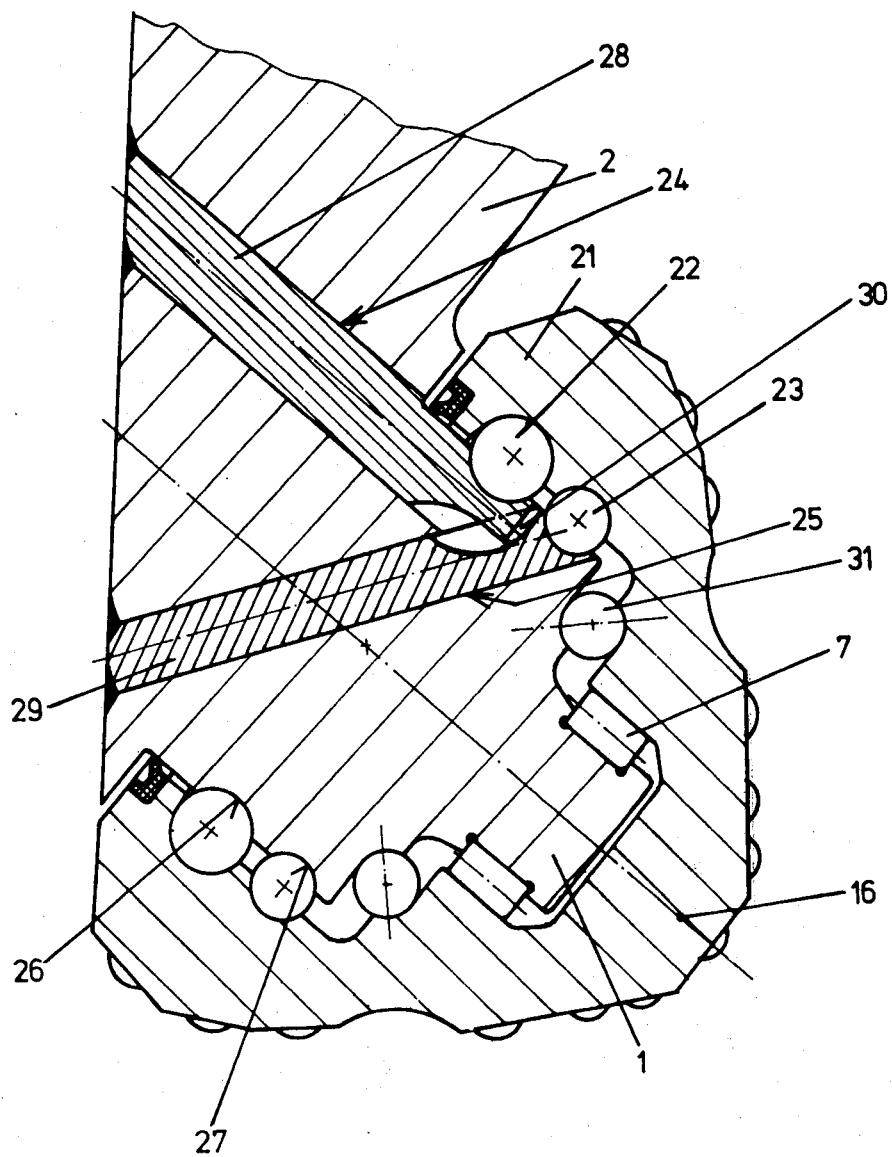
FIG. 2 is a longitudinal cross sectional view similar to FIG. 1 of a modified rotary drill bit in accordance with the present invention.

There is illustrated in FIG. 2 a modified version of the rotary drill bit in accordance with the present invention. The rotary cutter 21 is supported in bearings on a trunnion 1 formed integrally with the drill bit body 2 similar to the rotary cutter of FIG. 1. In the present instance, however, the balls for the bearing 22 near the drill bit body 2 which is under relatively high stress are of a diameter larger than the diameter of the balls of the bearing 23 located further away from the drill bit body 2 and which are under less stress. Additionally, the filling port 24 for the balls of the bearing 22 is disposed parallel to the axial rotation 6 of the rotary cutter 21 and the filling port or opening 25 runs essentially transverse to the axis of rotation 16. Furthermore, both filling ports 24, 25 open into the unstressed zone of the bearings 22, 23 in the raceway grooves 26 and 27 respectively of these bearings formed integrally on the trunnion 1. These grooves are located in a common longitudinal plane of the trunnion 1 which is stressed relatively little in bending. Filler pins 28, 29 close the ports 24 and 25. The end of each filler pin 28, 29 similar to the previously described embodiment is shaped at its outer terminal end confronting the raceway of a predetermined configuration to conform to the raceway profile. Note also that the end of the filler pin 28 engages in the clearance of the filler pin 29 and, therefore, produces a rigid complete closing of the two filling ports at their terminus located in the appropriate raceway groove 26, 27 which as illustrated are arranged next to each other in order to obtain a strong support in the narrowest space.

The rotary drill bit in accordance with the present invention has a distinct advantage that each trunnion of the rotary drill bit has a high rigidity and strength, is characterized by construction preventing withdrawal of the rotary cutter from the trunnion and is one that can be produced with a minimum of parts in a high economical fashion.

Even though specific embodiments of the present invention have been illustrated and described herein, it is not intended to limit the invention and changes and modifications may be made within the scope of the following claims. Specifically, in the embodiments illustrated the rotary cutter is supported on the trunnion by two rows of ball bearings in close side-by-side relation. It is to be understood that more than two rows may be utilized. In this manner, additional filling ports and filler pins will be associated with any additional rows of balls where more than two rows are utilized.

What is claimed is:

1. A rotary drill bit assembly comprising a drill bit body, at least one trunnion formed integrally with the drill bit body, a rotary cutter rotatably supported on the trunnion by at least two rows of balls, said trunnion being a one-piece member, means defining a raceway groove formed integrally in the trunnion for each of the ball bearings, means defining a raceway groove in the interior peripheral surface of said rotary cutter for each of the ball bearings, both said ball bearing assemblies securing the rotary cutter against axial withdrawal from the trunnion, means defining filling ports in the drill bit body for each of the rows of ball bearings, each filling port terminating at its inner end in the corresponding raceway for one of the rows of balls, each filling port being separate and disposed in said trunnion at different angles, and a filler pin for closing each filling port having a terminal end which complements the cross section of the raceway groove, said arrangement providding a trunnion construction which resists bending fracture during mounting and dismounting of the rotary drill bit so it is able to withstand heavy axial impact loads.

2. A rotary drill bit as claimed in claim 1 wherein the inner terminal ends of the filling ports and filler pins are located in the unstressed zone of the raceways so that the inner ends of the pins are not exposed to stress.

3. A rotary drill bit as claimed in claim 1 wherein filler ports intersect adjacent the raceways and the inner terminal end of one filler pin engages in a clearance of the other filler pin thereby producing a rigid complete closing of the filler ports at their terminals located adjacent to the raceway grooves.

4. A rotary drill bit assembly as claimed in claim 1 wherein each row of balls is arranged in a raceway groove formed directly in the rotary cutter.

5. A rotary drill bit assembly as claimed in claim 1 wherein the filling port for at least one of the rows of balls is disposed essentially parallel to the axis rotation of the rotary cutter.

6. A rotary drill bit assembly as claimed in claim 1 wherein the filling port for at least one of the rows of balls is oriented transversely to the direction of the axis rotation of the rotary cutter.

7. A rotary drill bit assembly as claimed in claim 1 wherein the filling ports for all of the ball bearings open into the unstressed zone of the bearings in the appropriate raceway groove of the trunnion.

8. A rotary drill bit assembly as claimed in claim 1 wherein the filling ports for the ball bearings of the rotary cutter are located in a common longitudinal plane of the trunnion.

9. A rotary drill bit assembly as claimed in claim 1 wherein the diameter of the balls of one of the rows nearest the drill bit body is larger than the diameter of the balls of the bearing furthest away from the drill bit body.

* * * * *